(12) United States Patent
Clark et al.

(10) Patent No.: US 10,994,494 B2
(45) Date of Patent: May 4, 2021

(54) TIRE SENSOR INSTALLATION SYSTEM AND METHOD

(71) Applicant: Android Industries LLC, Auburn Hills, MI (US)

(72) Inventors: Barry A. Clark, Ortonville, MI (US); Donald Graham Straitiff, Howell, MI (US); Lawrence J. Lawson, Troy, MI (US); Joshua James Hicks, Grand Blanc, MI (US); Christopher Michael Bulliner, Goodrich, MI (US); Anthony Willard Pierce, Owosso, MI (US)

(73) Assignee: Android Industries LLC, Auburn Hills, MI (US)

( * ) Notice: Subject to any disclaimer, the term of this patent is extended or adjusted under 35 U.S.C. 154(b) by 78 days.

(21) Appl. No.: 16/279,388

(22) Filed: Feb. 19, 2019

(65) Prior Publication Data
US 2019/0255782 A1    Aug. 22, 2019

Related U.S. Application Data

(60) Provisional application No. 62/632,290, filed on Feb. 19, 2018.

(51) Int. Cl.
*B29C 65/48* (2006.01)
*F16B 11/00* (2006.01)
(Continued)

(52) U.S. Cl.
CPC .......... *B29C 65/48* (2013.01); *B25J 11/005* (2013.01); *B25J 11/0075* (2013.01);
(Continued)

(58) Field of Classification Search
CPC ...... B60C 23/04; B60C 23/0491–0493; B29D 2030/0077; B29D 2030/0011; H01Q 1/2241; B29C 66/863; B25J 11/005
See application file for complete search history.

(56) References Cited

U.S. PATENT DOCUMENTS

2001/0045250 A1    11/2001 Koch et al.
2005/0274448 A1    12/2005 Lettieri et al.
(Continued)

FOREIGN PATENT DOCUMENTS

JP           4205274 B2     1/2009

OTHER PUBLICATIONS

International Search Report for International Application No. PCT/US2019/018510 dated May 30, 2019.

*Primary Examiner* — Matthew P Travers
(74) *Attorney, Agent, or Firm* — Honigman LLP

(57) ABSTRACT

A method for installing a sensor onto an inner surface of a tire is generally disclosed. The method includes robotically deglazing at least a portion of the inner surface of the tire, defining a preconditioned surface. The sensor is robotically selected and a target surface of the sensor is cleaned. An adhesive is applied to at least a portion of the target surface of the sensor. In some embodiments, the adhesive is applied to a portion of the preconditioned surface. The sensor is robotically positioned, wherein the target surface of the sensor abuts the preconditioned surface. A wet-out operation is performed, wherein a predetermined pressure is applied to the sensor for a predetermined period of time to affix the sensor to the preconditioned surface.

20 Claims, 13 Drawing Sheets

(51) Int. Cl.
  *B25J 11/00* (2006.01)
  *B60C 23/04* (2006.01)
  *B29C 65/00* (2006.01)
  *B29L 30/00* (2006.01)
  *B29D 30/00* (2006.01)
  *H01Q 1/22* (2006.01)

(52) U.S. Cl.
  CPC ........ *B29C 66/026* (2013.01); *B29C 66/0246* (2013.01); *B60C 23/04* (2013.01); *F16B 11/006* (2013.01); *B29D 2030/0011* (2013.01); *B29D 2030/0077* (2013.01); *B29L 2030/00* (2013.01); *B60C 23/0493* (2013.01); *H01Q 1/2241* (2013.01)

(56) References Cited

U.S. PATENT DOCUMENTS

| | | | |
|---|---|---|---|
| 2008/0143511 A1* | 6/2008 | Kamphuis | B60C 23/0493 340/500 |
| 2010/0243127 A1* | 9/2010 | Chebli | B29D 30/0005 156/64 |
| 2014/0360019 A1 | 12/2014 | Brusarosco et al. | |
| 2017/0050330 A1* | 2/2017 | Kerwin | B26D 1/385 |
| 2017/0080608 A1* | 3/2017 | Nakamura | B29D 30/06 |
| 2018/0045611 A1 | 2/2018 | Kraus et al. | |

\* cited by examiner

TIRE SENSOR INSTALLATION SYSTEM AND METHOD

CROSS REFERENCE TO RELATED APPLICATIONS

This patent application claims priority under 35 U.S.C. § 119(e) to U.S. Provisional Application 62/632,290, filed on Feb. 19, 2018. The disclosures of this prior application is considered part of the disclosure of this application and is hereby incorporated by reference in their entireties.

FIELD

The disclosure relates to a system and method for installing a sensor onto an inner surface of a tire.

BACKGROUND

It may be important to monitor a tire's air pressure to ensure the tire is inflated to a proper air pressure. Tires that are inflated to a proper air pressure may exhibit increased performance and safety. To that end, it may be advantageous to implement a pressure-sensing device with a tire, for example, on an inner surface of the tire. There may be applications where it is advantageous to have an automated process wherein a portion of an inner surface of a tire and a bottom surface of a sensor are preconditioned, and, subsequently, the sensor is securely installed onto the inner surface of the tire.

BRIEF DESCRIPTION OF THE DRAWINGS

The disclosure will now be described, by way of example, with reference to the accompanying drawings, in which.

Corresponding reference numerals indicate corresponding parts throughout the drawings.

SUMMARY

Figure 1A:
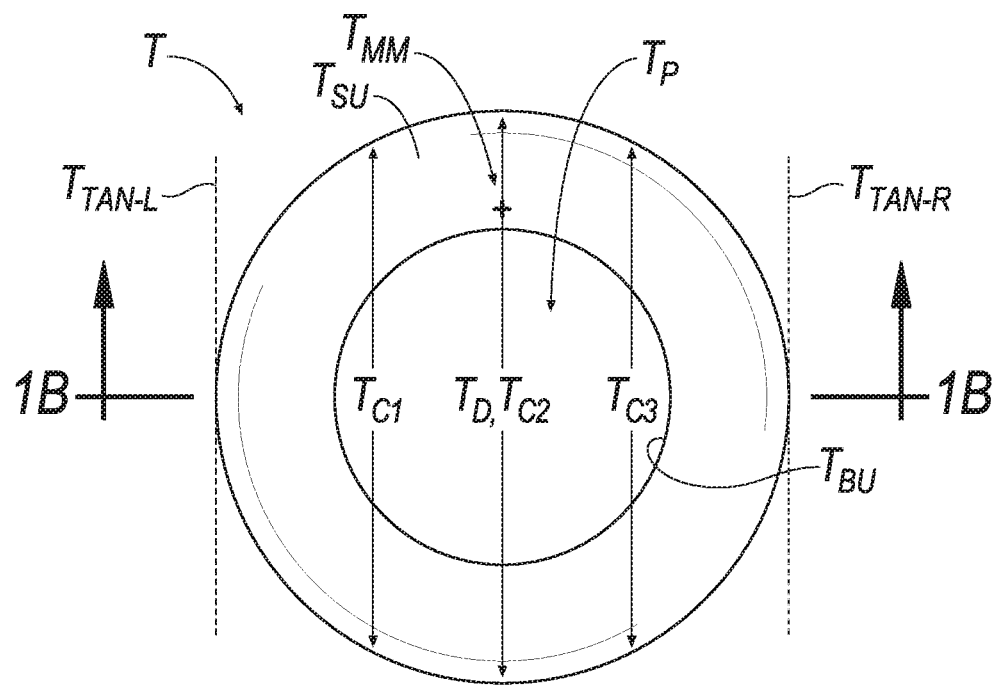
FIG. 1A is a top view of an exemplary tire.

One aspect of the disclosure provides a method for installing a sensor onto an inner surface of a tire. The method includes robotically deglazing at least a portion of the inner surface of the tire, defining a preconditioned surface, robotically selecting the sensor, cleaning a target surface of the sensor, applying an adhesive to a least a portion of the target surface of the sensor, robotically positioning the sensor, wherein the target surface of the sensor abuts the preconditioned surface, and performing a wet-out operation, wherein a predetermined pressure is applied to the sensor for a predetermined period of time to affix the sensor to the preconditioned surface.

Implementations of the disclosure may include one or more of the following optional features. In some examples, at least a portion of the inner surface of the tire is robotically deglazed by means of a laser. The laser may be operated at a wavelength between approximately 1040 nm and 1200 nm. The laser may provide an output of up to approximately 130 watts, with a maximum pulse energy of less than approximately 2.0 millijoules, a repetition frequency ranging from approximately 1 kHz to 1000 kHz, and a pulse duration ranging from approximately 1 nanosecond to 500 nanoseconds.

In some examples, at least a portion of the inner surface of the tire is robotically deglazed by means of a mechanical brush.

In some examples, at least a portion of the inner surface of the tire is robotically deglazed by means of a chemical wipe.

In some examples, the target surface is a bottom surface of the sensor.

One aspect of the disclosure provides a method for installing a sensor onto an inner surface of a tire. The method includes robotically deglazing at least a portion of the inner surface of the tire, defining a preconditioned surface, robotically applying an adhesive to at least a portion of the preconditioned surface, robotically selecting the sensor, cleaning a target surface of the sensor, robotically positioning the sensor, wherein the target surface of the sensor abuts the preconditioned surface, and performing a wet-out operation, wherein a predetermined pressure is applied to the sensor for a predetermined period of time to affix the sensor to the preconditioned surface.

Implementations of the disclosure may include one or more of the following optional features. In some examples, at least a portion of the inner surface of the tire is robotically deglazed by means of a laser. The laser may be operated at a wavelength between approximately 1040 nm and 1200 nm. The laser may provide an output of up to approximately 130 watts, with a maximum pulse energy of less than approximately 2.0 millijoules, a repetition frequency ranging from approximately 1 kHz to 1000 kHz, and a pulse duration ranging from approximately 1 nanosecond to 500 nanoseconds.

In some examples, at least a portion of the inner surface of the tire is robotically deglazed by means of a mechanical brush.

In some examples, at least a portion of the inner surface of the tire is robotically deglazed by means of a chemical wipe.

In some examples, the target surface is a bottom surface of the sensor.

The details of one or more implementations of the disclosure are set forth in the accompanying drawings and the description below. Other aspects, features, and advantages will be apparent from the description and drawings, and from the claims.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The figures illustrate an exemplary implementation of a system and method for installing a sensor on an inner surface of a tire. Based on the foregoing, it is to be generally understood that the nomenclature used herein is simply for convenience and the terms used to describe the present disclosure should be given the broadest meaning by one of ordinary skill in the art.

Prior to describing embodiments of the present disclosure, reference is made to FIGS. 1A-1D, which illustrates an exemplary tire T. In the present disclosure, reference may be made to the "upper," "lower," "left," "right" and "side" of the tire T; although such nomenclature may be utilized to describe a particular portion or aspect of the tire T, such nomenclature may be adopted due to the orientation of the tire T with respect to structure that supports the tire T. Accordingly, the above nomenclature should not be utilized to limit the scope of the claimed disclosure and is utilized herein for exemplary purposes in describing an embodiment of the present disclosure.

In an embodiment, the tire T includes an upper sidewall $T_{SU}$ (see, e.g., FIG. 1A), a lower sidewall $T_{SL}$ (see, e.g., FIG. 1D) and a tread surface $T_T$ (see, e.g., FIGS. 1B-1C), that joins the upper sidewall $T_{SU}$ to the lower sidewall $T_{SL}$. Referring to FIG. 1B, the upper sidewall $T_{SU}$ may rise away from the tread surface $T_T$ to a peak and subsequently descend at a slope to terminate at and form a circumferential upper bead, $T_{BU}$; similarly, the lower sidewall $T_{SL}$ may rise away from the tread surface $T_T$ to a peak and subsequently descend at a slope to terminate at and form a circumferential lower bead $T_{BL}$.

As seen in FIG. 1B, when the tire T is in a relaxed, unbiased state, the upper bead $T_{BU}$ forms a circular, upper tire opening $T_{OU}$; similarly, when the tire T is in a relaxed, unbiased state, the lower bead $T_{BL}$ forms a circular, lower tire opening, $T_{OL}$. It will be appreciated that when an external force is applied to the tire T, the tire T may be physically manipulated, and, as a result, one or more of the upper tire opening $T_{OU}$ and the lower tire opening $T_{OL}$ may be temporality upset such that one or more of the upper tire opening $T_{OU}$ and the lower tire opening $T_{OL}$ is/are not entirely circular, but, may, for example, be manipulated to include an elliptical shape.

Figure 1B:
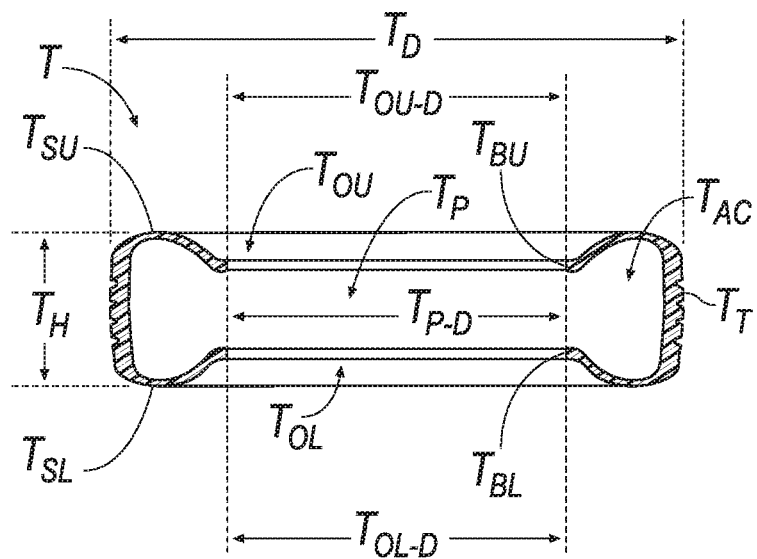
FIG. 1B is a cross-sectional view of the tire according to line 1B-1B of FIG. 1A.
Figure 1C:
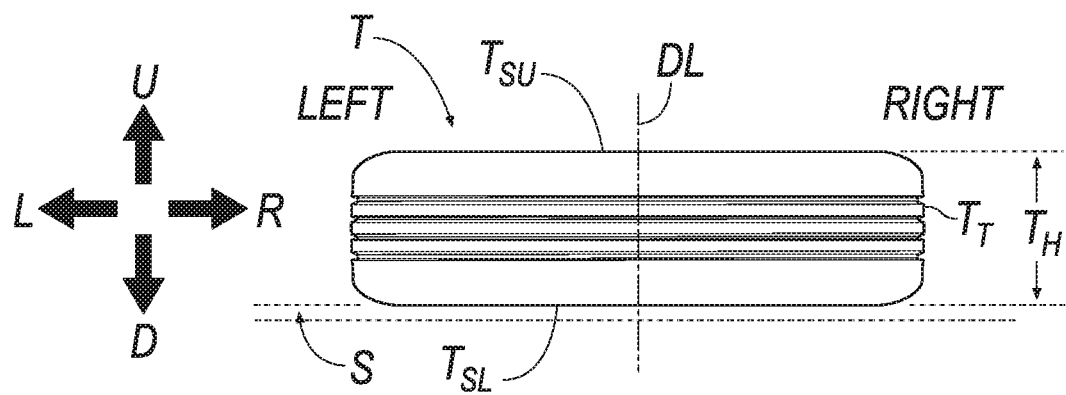
FIG. 1C is a side view of the tire of FIG. 1A.
Figure 1D:
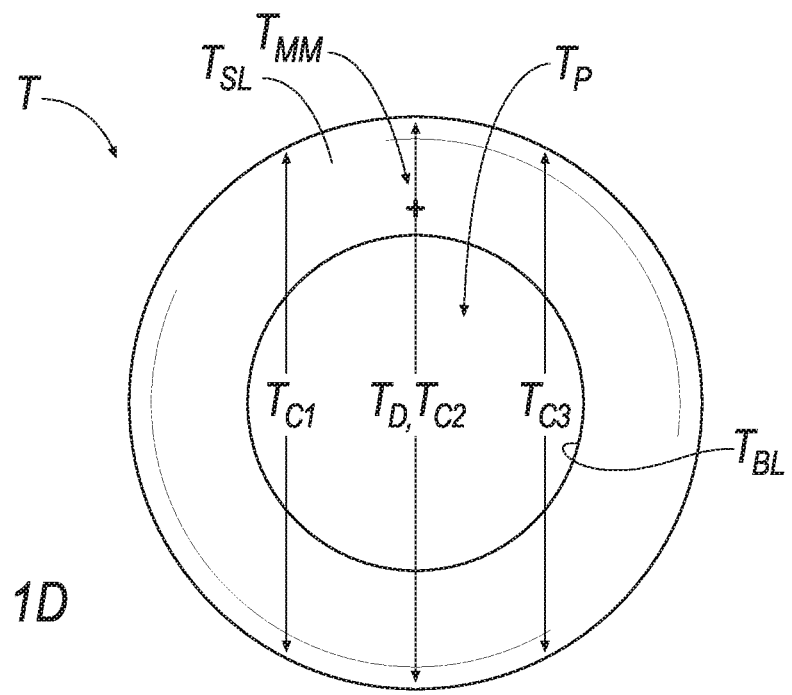
FIG. 1D is bottom view of the tire of FIG. 1A.

Referring to FIGS. 1A and 1D, when in the relaxed, unbiased state, each of the upper tire opening $T_{OU}$ and the lower tire opening $T_{OL}$ form, respectively, an upper tire opening diameter $T_{OU-D}$ and a lower tire opening diameter $T_{OL-D}$. Further, as seen in FIGS. 1A and 1D, when in the relaxed, unbiased state, the upper sidewall $T_{SU}$ and the lower sidewall $T_{SL}$ define the tire T to include a tire diameter $T_D$.

Referring to FIGS. 1A, 1B, and 1D, the tire T also includes a passage $T_P$. Access to the passage $T_P$ is permitted by either of the upper tire opening $T_{OU}$ and the lower tire opening $T_{OL}$. Referring to FIG. 1B, when the tire T is in a relaxed, unbiased state, the upper tire opening $T_{OU}$ and the lower tire opening $T_{OL}$ define the passage $T_P$ to include a diameter $T_{P-D}$. The tire T includes a circumferential air cavity $T_{AC}$ that is in communication with the passage $T_P$.

Referring to FIG. 1C, the tire T is shown relative to a support member S; the support member S is provided (and shown in phantom) in order to establish a frame of reference for the "left" portion and the "right" portion of the tire T. In FIG. 1C, the tire T is arranged in a "non-rolling" orientation such that the tread surface $T_T$ is not disposed adjacent the phantom support member S but, rather, the lower sidewall $T_{SL}$ is disposed adjacent the phantom support member S. A center dividing line DL equally divides the "non-rolling" orientation of the tire T in half in order to generally indicate a "left" portion of the tire T and a "right" portion of the tire T.

As discussed above, reference is made to several diameters $T_{P-D}$, $T_{OU-D}$, $T_{OL-D}$ of the tire T. According to geometric theory, a diameter passes through the center of a circle, or, in the present disclosure, the axial center of the tire T, which may alternatively be referred to as an axis of rotation of the tire T. Geometric theory also includes the concept of a chord, which is a line segment that whose endpoints both lie on the circumference of a circle; according to geometric theory, a diameter is the longest chord of a circle.

In the following description, the tire T may be moved relative to structure; accordingly, in some instances, a chord of the tire T may be referenced in order to describe an embodiment of the present disclosure. Referring to FIG. 1A, several chords of the tire T are shown generally at $T_{C1}$, $T_{C2}$ (i.e., the tire diameter, $T_D$) and $T_{C3}$.

The chord $T_{C1}$ may be referred to as a "left" tire chord. The chord $T_{C3}$ may be referred to as a "right" tire chord. The chord $T_{C2}$ may be equivalent to the tire diameter $T_D$ and be referred to as a "central" chord. Both of the left and right tire chords $T_{C1}$, $T_{C3}$, include a geometry that is less than central chord $T_{C2}$/tire diameter $T_D$.

In order to reference the location of the left chord $T_{C1}$ and the right chord $T_{C3}$ reference is made to a left tire tangent line $T_{TAN-L}$ and a right tire tangent line $T_{TAN-R}$. The left chord $T_{C1}$ is spaced apart approximately one-fourth (¼) of the tire diameter $T_D$ from the left tire tangent line $T_{TAN-L}$. The right chord $T_{C3}$ is spaced apart approximately one-fourth (¼) of the tire diameter $T_D$ from the right tire tangent line $T_{TAN-R}$. Each of the left and right tire chords $T_{C1}$, $T_{C3}$ may be spaced apart about one-fourth (¼) of the tire diameter $T_D$ from the central chord $T_{C2}$. The above spacings referenced from the tire diameter $T_D$ are exemplary and should not be meant to limit the scope of the present disclosure to approximately a one-fourth (¼) ratio; accordingly, other ratios may be defined, as desired.

Further, as will be described in the following disclosure, the tire, T, may be moved relative to structure. Referring to FIG. 1C, the movement may be referenced by an arrow U to indicate upwardly movement or an arrow D to indicate downwardly movement. Further, the movement may be referenced by an arrow L to indicate left or rearwardly movement or an arrow R to indicate right or forwardly movement.

Figure 2:
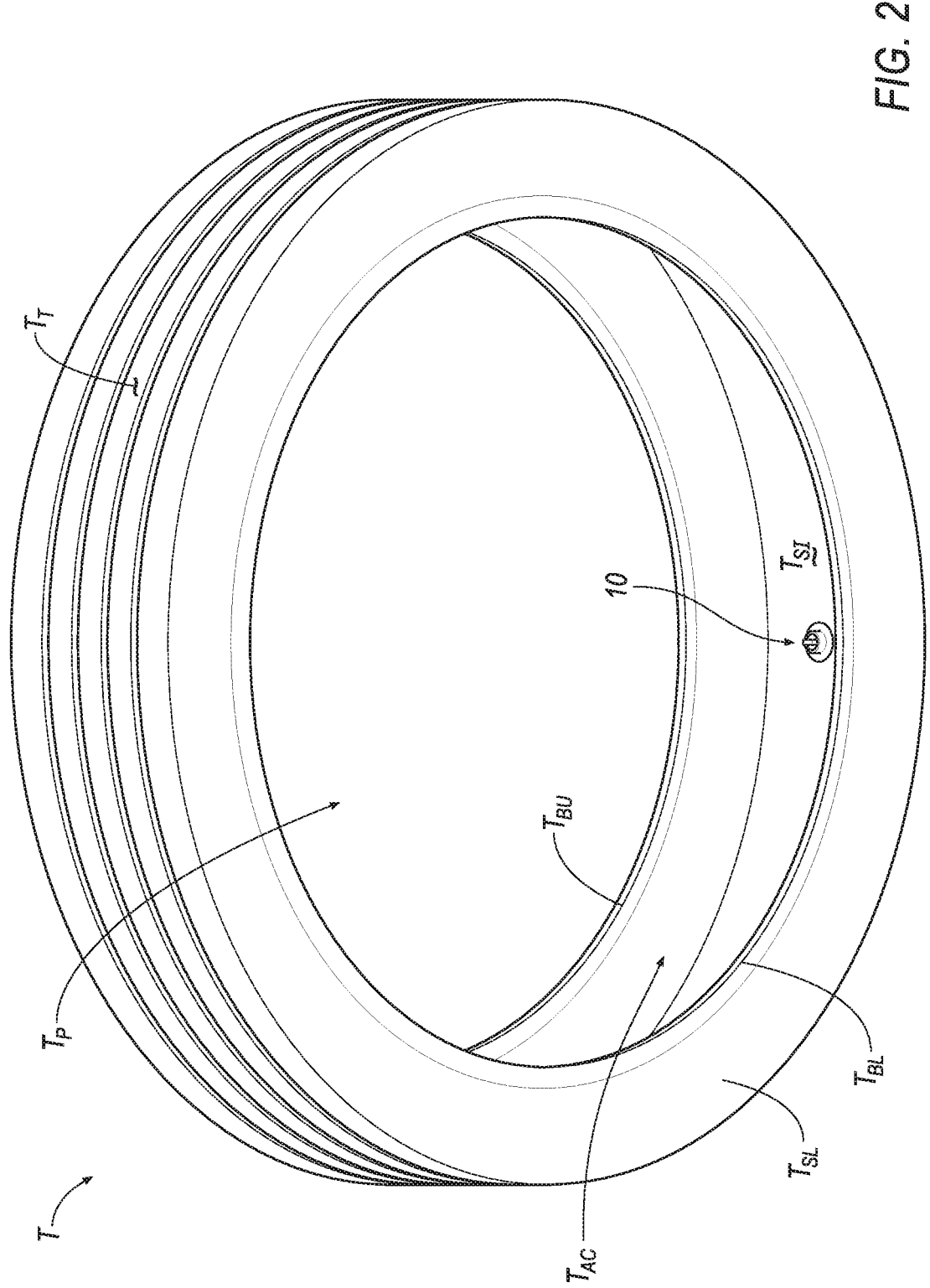
FIG. 2 is a perspective view of an exemplary tire with a sensor installed onto its inner surface.
Figure 3:
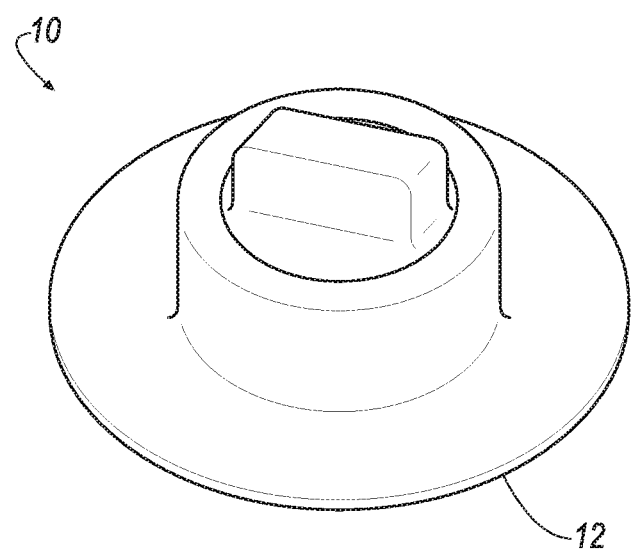
FIG. 3 is a perspective view of an exemplary sensor.

With reference to FIG. 2, the tire T may include an inner surface $T_{SI}$ opposite the tread surface $T_T$. As will become apparent, a sensor 10 may be affixed to the inner surface $T_{SI}$ of the tire T. The sensor 10 may include a target surface that abuts and is affixed to the inner surface $T_{SI}$ of the tire T. In some implementations, the target surface is a bottom surface 12 of the sensor 10. In other implementations, the target surface is any suitable surface or portion of the sensor 10.

The sensor 10 may be part of a tire pressure monitoring system (TPMS) of a vehicle to provide a plurality of data to the vehicle. The plurality of data may include pressure, temperature, rate of revolution, etc. In some implementations, the sensor 10 is in wired or wireless communication with a control module. The control module may be in wired or wireless communication with a dashboard of the vehicle to provide information to a driver of the vehicle based on the data collected by the sensor 10. The information provided to the driver may be displayed via indicator lights, LED displays, etc., and the information may include pressure, temperature, rate of revolution, etc.

With reference to FIGS. 4A-7, a sensor installation module 20 is generally shown. The sensor installation module 20 includes a robot 22 having an arm 24. The arm 24 may include a hinge 26 and an end effector 28. The robot 22 may be any suitable robot, such as, for example, a cartesian robot, a scara robot, a 6-axis robot, a redundant robot, or a dual-arm robot. The hinge 26 may allow the arm 24 of the robot 22 to pivot or rotate to increase the directional capabilities of the robot 22. As described in greater detail below, the end effector 28, directly or indirectly, may be capable of performing a plurality of processes, including deglazing a portion of the tire T, applying adhesive to one of the tire T and the sensor 10, and grasping and moving the sensor 10.

Figure 4A:
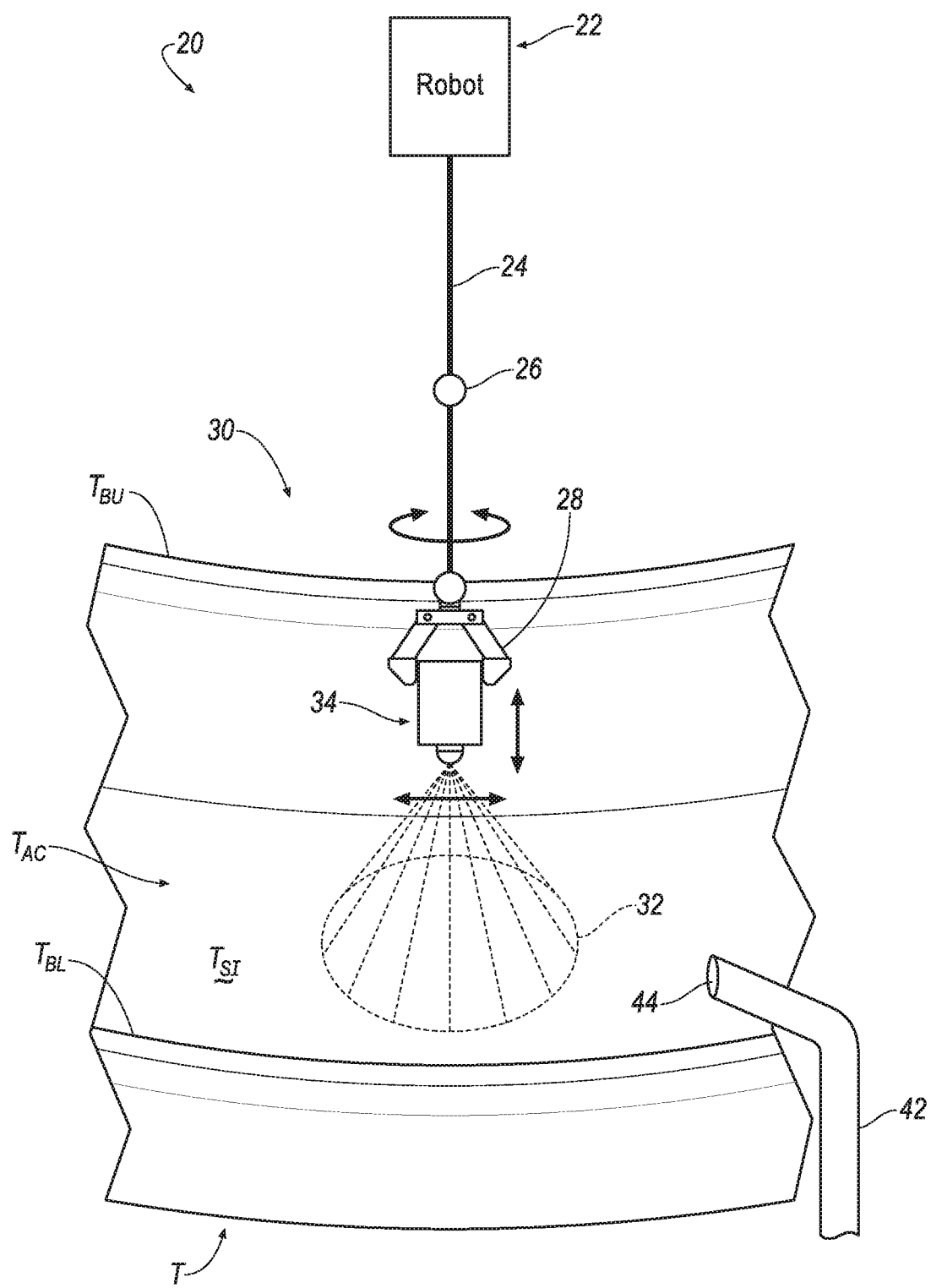
FIG. 4A illustrates a perspective view of a method for deglazing an inner surface of a tire by means of a laser in accordance with an exemplary embodiment of the present disclosure.
Figure 4B:
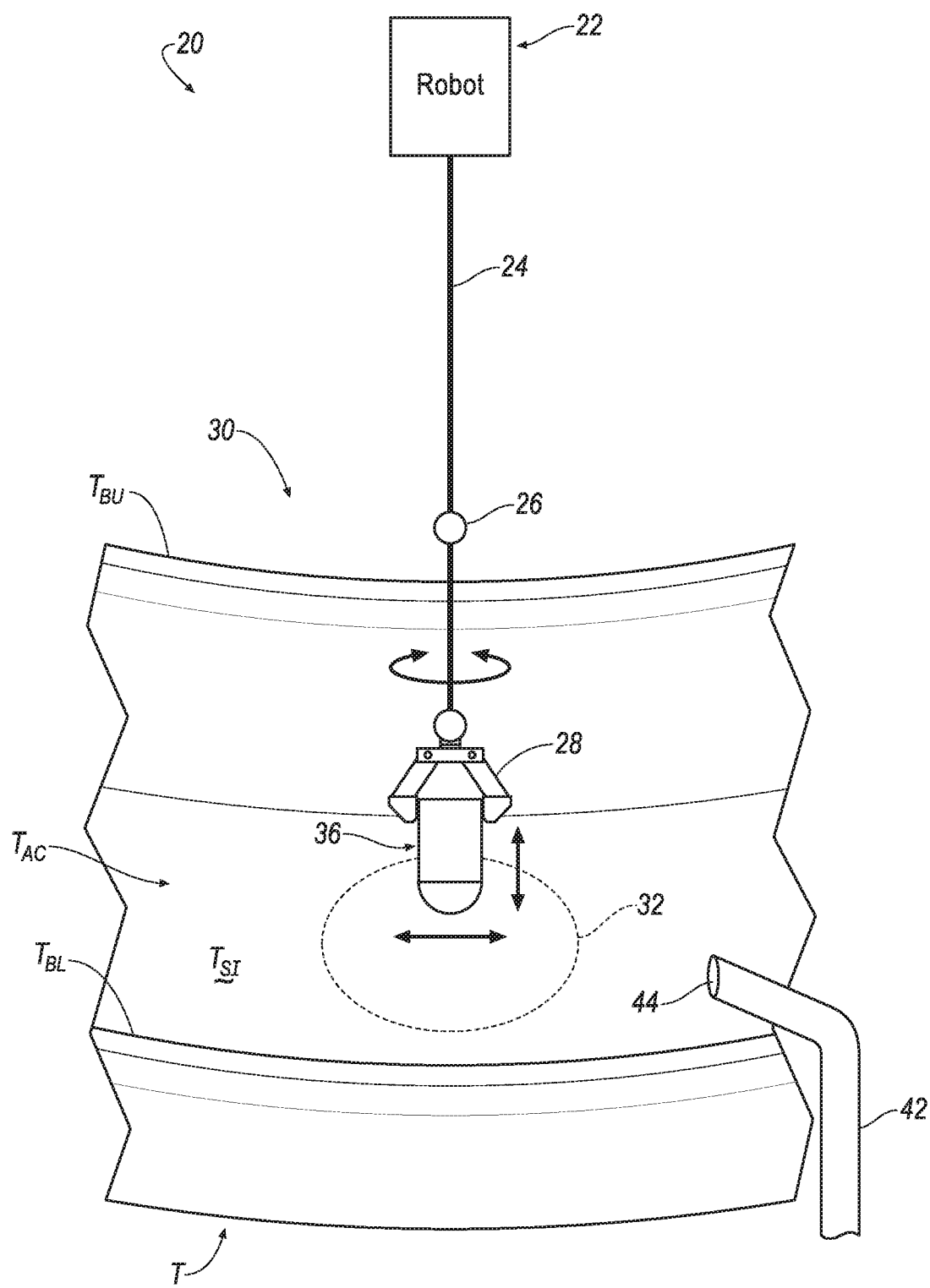
FIG. 4B illustrates a perspective view of a method for deglazing an inner surface of a tire by means of a mechanical brush in accordance with an exemplary embodiment of the present disclosure.
Figure 4C:
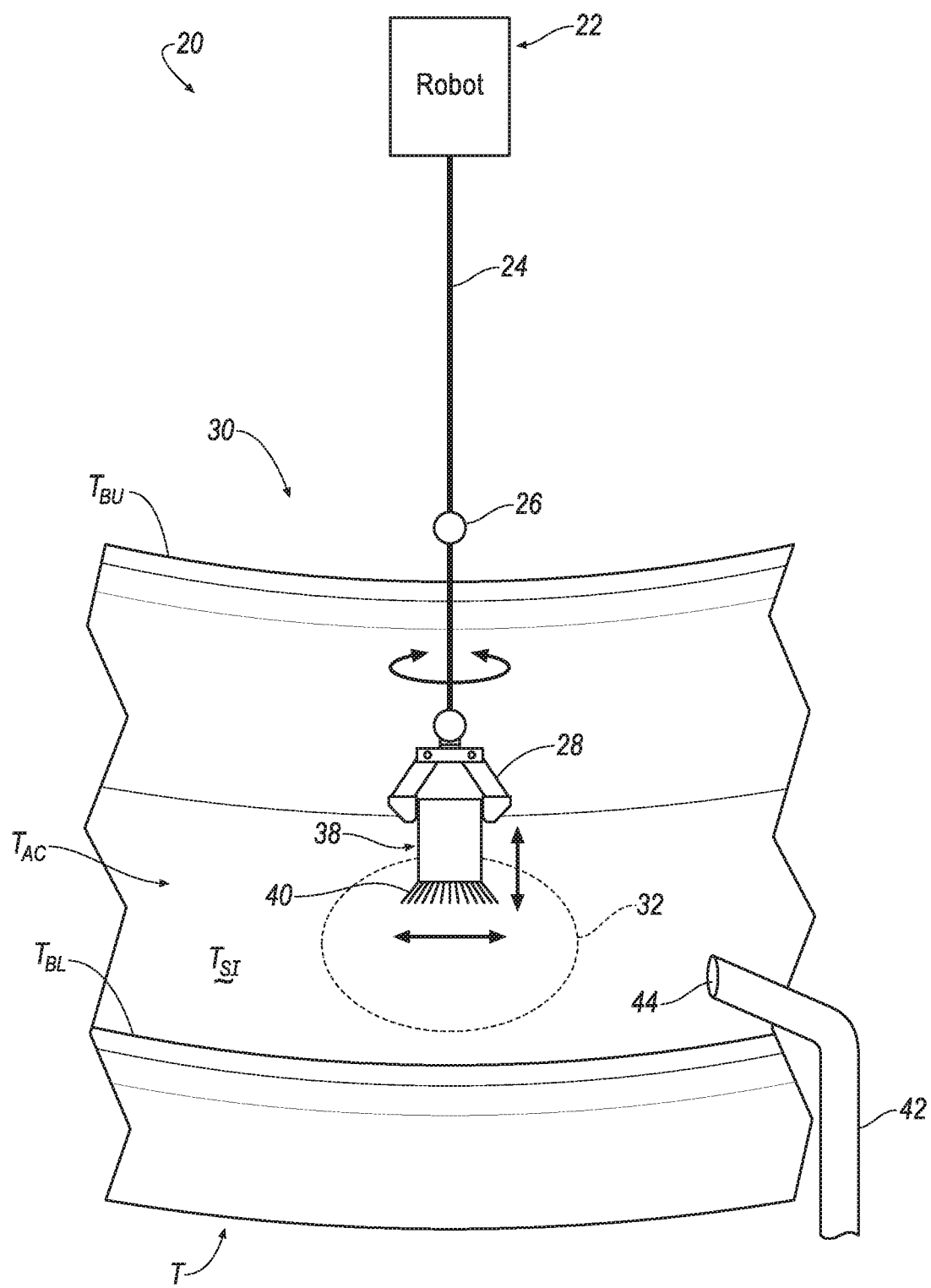
FIG. 4C illustrates a perspective view of a method for deglazing an inner surface of a tire by means of a chemical wipe in accordance with an exemplary embodiment of the present disclosure.

As shown in FIGS. 4A-C, the sensor installation module 20 includes a treatment station 30, at which, at least a portion of the inner surface $T_{SI}$ of the tire T is cleaned or deglazed to define and create a preconditioned surface 32 to maximize adhesion characteristics of the inner surface $T_{SI}$ at the preconditioned surface 32. In some implementations, the preconditioned surface 32 has a length of at least 40 mm and a width of at least 40 mm. In some implementations, the preconditioned surface 32 has a generally circular shape with a radius of at least 20 mm. In other implementations, the preconditioned surface 32 may have any suitable size and shape.

With reference to FIG. 4A, the treatment station 30 may include a laser 34. In some implementations, the end effector 28 of the robot 22 may be configured to receive and manipulate the laser 34. In other implementations, the end effector 28 may be integrally formed with or replaced by the laser 34. The laser 34 may be configured to clean or deglaze at least a portion of the inner surface $T_{SI}$ of the tire T to define and create the preconditioned surface 32. In some examples, there may be two or more lasers 34 to define and create two or more discrete preconditioned surfaces 32. In some examples, the laser 34 may be a 60 watt, Q-switched fiber laser operating at a wavelength between 1040 nm and 1200 nm. The laser 34 may be configured to provide an output of up to 130 watts, with a maximum pulse energy of less than 2.0 millijoules, a repetition frequency ranging from 1 kHz to 1000 kHz, and a pulse duration ranging from 1 nanosecond to 500 nanoseconds. Alternatively, the laser 34 may operate under any suitable parameters and conditions. In some examples, by manipulating at least one of the pulse rate, frequency, power, and laser direction, the inner surface 1 of tire 10 only experiences negligible temperature increase during the deglazing step.

With reference to FIG. 4B, the treatment station 30 may include a chemical wipe 36. In some implementations, the end effector 28 of the robot 22 may be configured to receive and manipulate the chemical wipe 36. In other implementations, the end effector 28 may be integrally formed with or replaced by the chemical wipe 36. The chemical wipe 36 may be configured to clean or deglaze at least a portion of the inner surface $T_{SI}$ of the tire T to define and create the preconditioned surface 32. In some examples, there may be two or more chemical wipes 36 to define and create two or more discrete preconditioned surfaces 32. The chemical wipe 36 may be formed of any suitable composition, such as, for example, a combination of one or more organic solvents, a combination of one or more inorganic solvents, a soap with grit, a soap without grit, etc.

With reference to FIG. 4C, the treatment station 30 may include a mechanical brush 38. In some implementations, the end effector 28 of the robot 22 may be configured to receive and manipulate the mechanical brush 38. In other implementations, the end effector 28 may be integrally formed with or replaced by the mechanical brush 38. The mechanical brush 38 may be configured to clean or deglaze at least a portion of the inner surface $T_{SI}$ of the tire T to define and create the preconditioned surface 32. In some examples, there may be two or more mechanical brushes 38 to define and create two or more discrete preconditioned surfaces 32. The mechanical brush 38 may include a plurality of bristles 40 that may engage the inner surface $T_{SI}$ of the tire T. The bristles 40 may be formed of any suitable material(s), such as, for example, nylon, steel, brass, etc.

With reference to FIGS. 4A-C, the treatment station 30 may include an exhaust system 42 having a nozzle 44 selectively disposed within the air cavity $T_{AC}$ of the tire T. The nozzle 44 may be moved between a retracted position inwardly from the tire beads $T_{BU}$, $T_{BL}$ and an extended position, whereby the nozzle 44 is disposed within the air cavity $T_{AC}$. In the extended position, the nozzle 44 may be disposed adjacent to the preconditioned surface 32, whereby the nozzle 44 is configured to remove fumes and debris resulting from the cleaning and deglazing of the inner surface $T_{SI}$ of the tire T. The nozzle 44 may be articulable to assist is positioning the nozzle 44 adjacent to the preconditioned surface 32.

With reference to FIGS. 5A-8, the sensor installation module 20 may include an installation station 46. In some implementations, the tire T is moved from the treatment station 30 to the installation station 46. In other implementations, the tire T may remain stationary, and the robot 22, e.g., the end effector 28, may adapt to change from the treatment station 30 to the installation station 46.

Figure 5A:
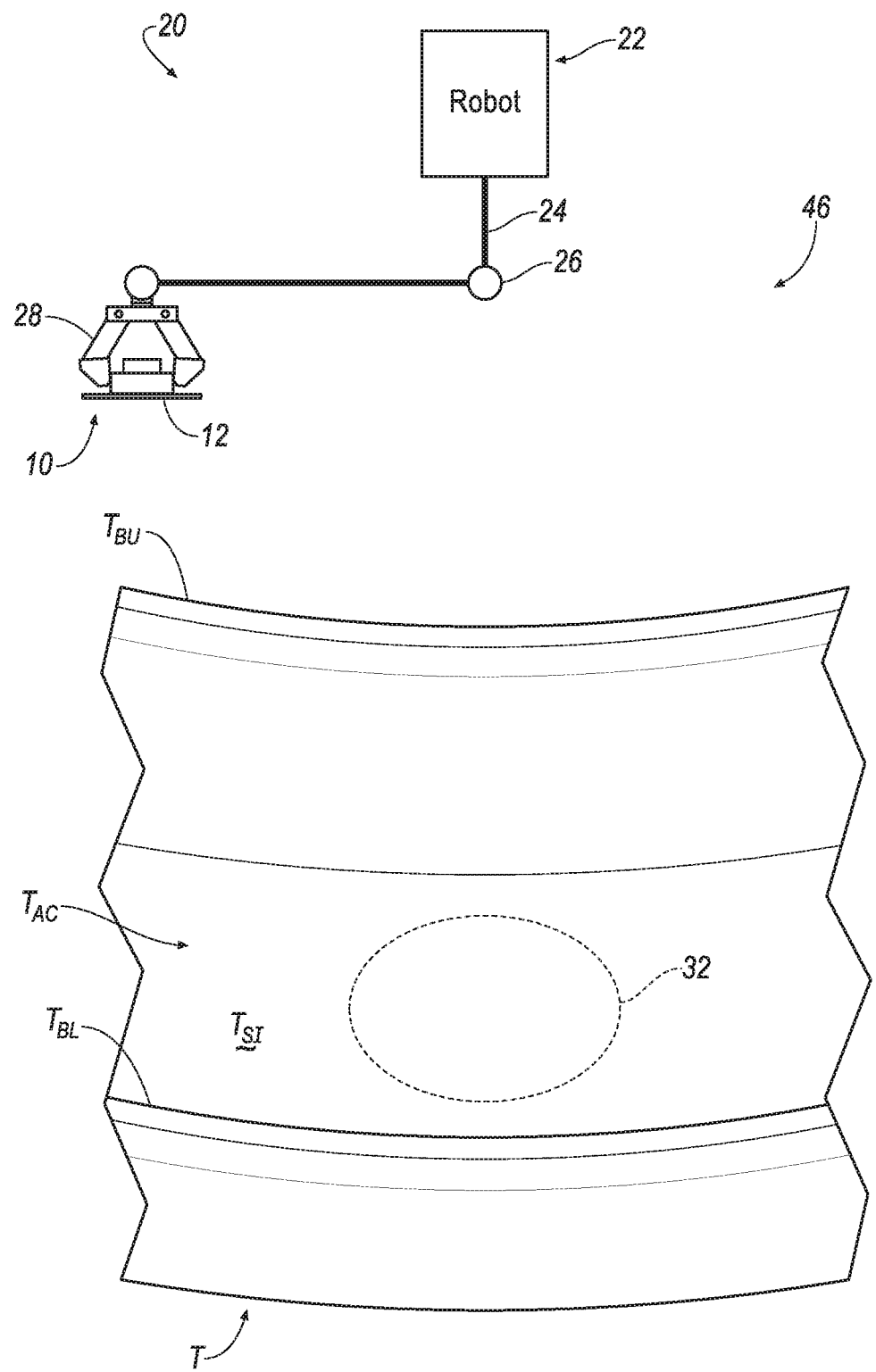
FIG. 5A illustrates a perspective view of a method for selecting a sensor in accordance with an exemplary embodiment of the present disclosure.

With reference to FIG. 5A, the robot 22 may select the sensor 10 to be installed and grasp the sensor 10 using the end effector 28. For example, the end effector 28 may grasp the sensor 10 such that the bottom surface 12 is exposed.

Figure 5B:
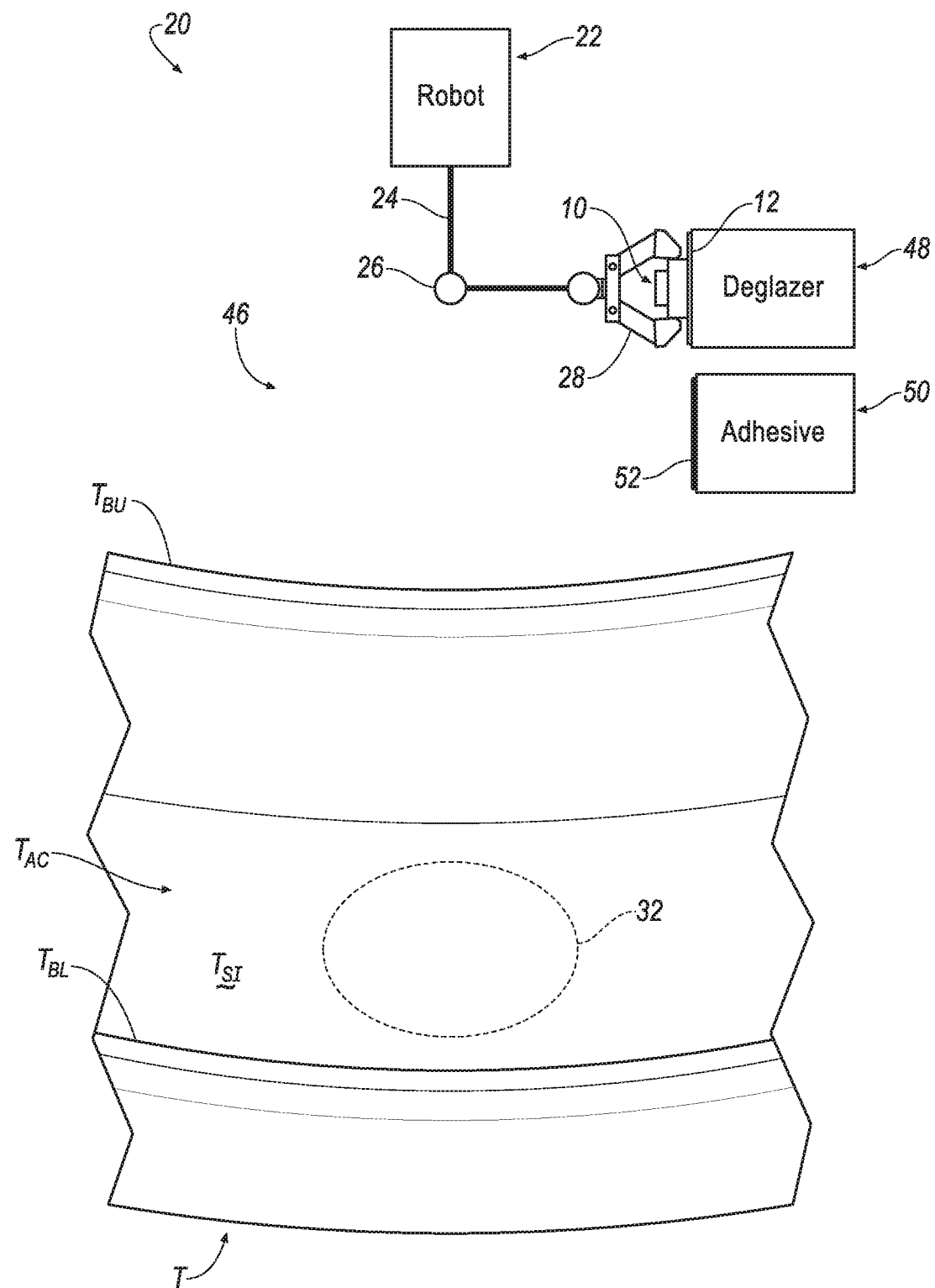
FIG. 5B illustrates a perspective view of a method for cleaning a bottom surface of the sensor in accordance with an exemplary embodiment of the present disclosure.

With reference to FIG. 5B, the installation station 46 may include a deglazer sub-station 48 and an adhesive sub-station 50. After selecting the sensor 10, the robot 22 may move the sensor 10 to the deglazer station 48, where the target surface, e.g., the bottom surface 12, of the sensor 10 may be cleaned or deglazed to maximize adhesion characteristics of the bottom surface 12. The bottom surface 12 may be cleaned or deglazed in any suitable manner, for example, in any manner described above, i.e., laser, chemical wipe, or mechanical brush.

Figure 5C:
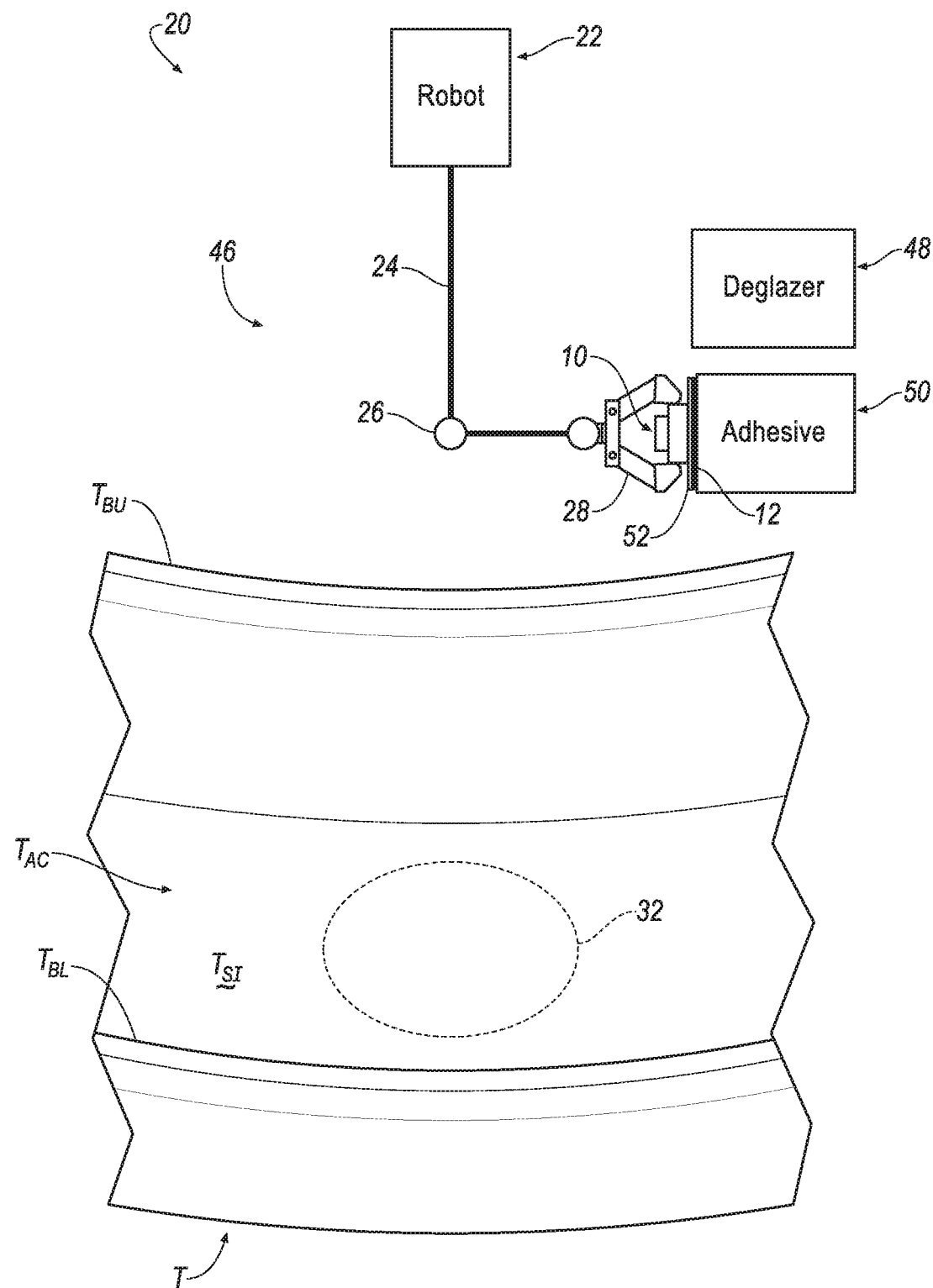
FIG. 5C illustrates a perspective view of a method for applying an adhesive to a sensor in accordance with an exemplary embodiment of the present disclosure.

As shown in FIG. 5C, the robot 22 may move the sensor 10 from the deglazer sub-station 48 to the adhesive sub-station 50, where an adhesive 52 may be applied to the bottom surface 12 of the sensor 10. The adhesive 52 may be any suitable adhesive, such as, for example, a methacrylate, a cyanoacrylate, an acrylic, an epoxy, etc.

Figure 6:
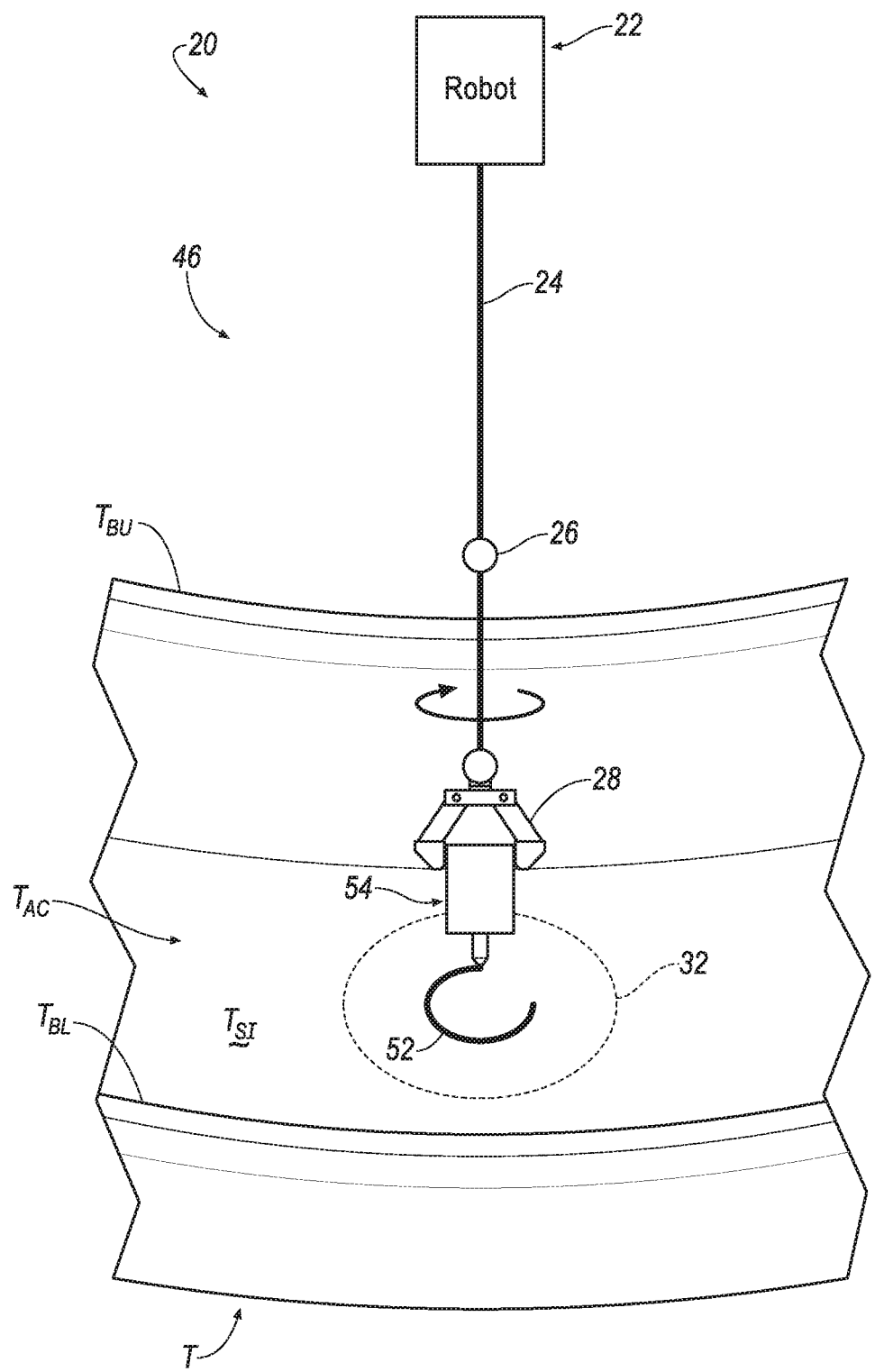
FIG. 6 illustrates a perspective view of a method for applying an adhesive to the inner surface tire in accordance with an exemplary embodiment of the present disclosure.

In addition or as an alternative to the adhesive 52 being applied to the bottom surface 12 of the sensor 10, the adhesive 52 may be applied to at least a portion of the preconditioned surface 32, as shown in FIG. 6. In some implementations, the end effector 28 of the robot 22 may be configured to receive and manipulate an adhesive applicator 54. In other implementations, the end effector 28 may be integrally formed with or replaced by the adhesive applicator 54. The adhesive applicator 54 may be configured to apply the adhesive 52 to at least a portion of the preconditioned surface 32.

Figure 7:
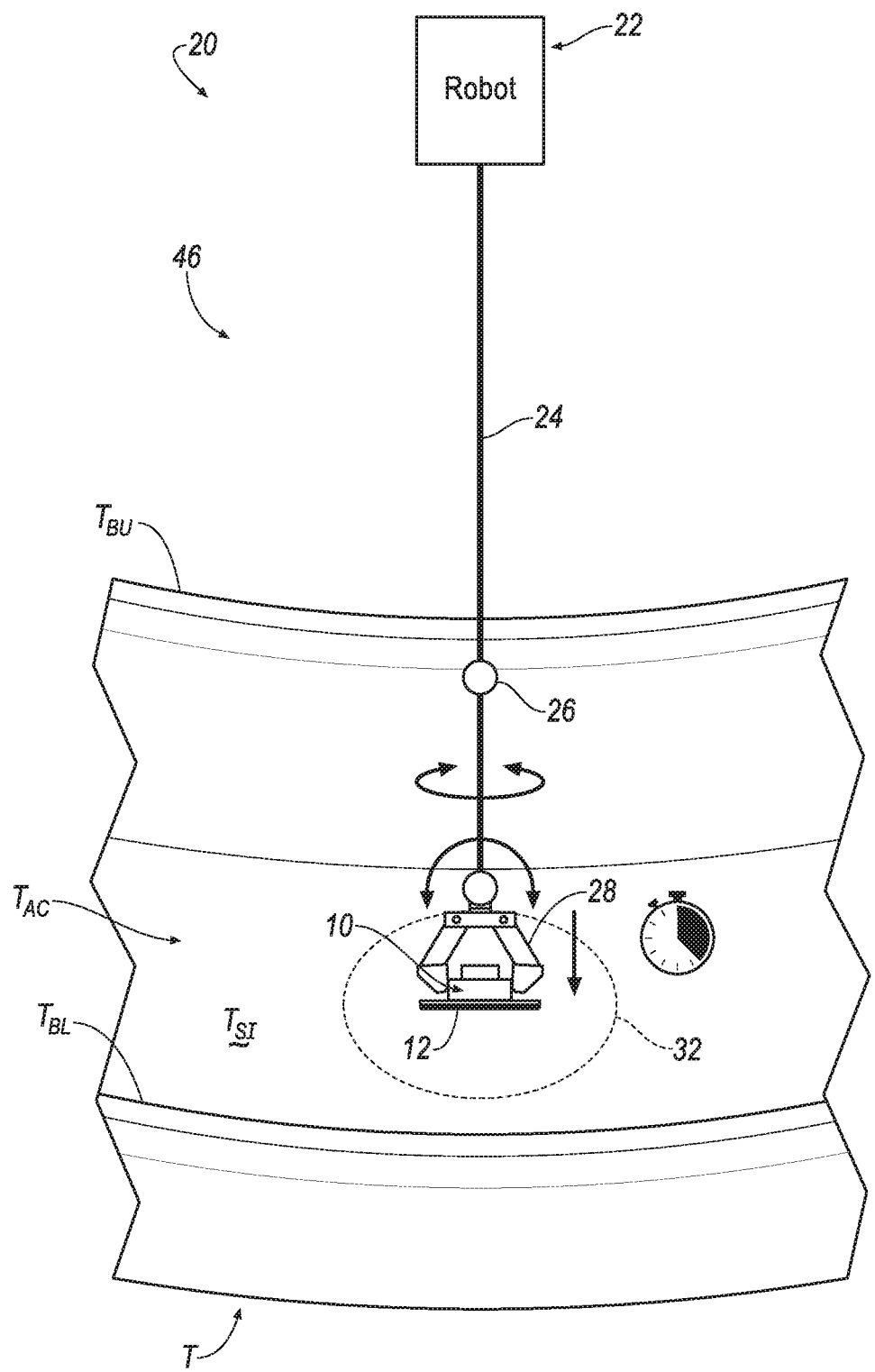
FIG. 7 illustrates a perspective view of a method for performing the wet-out operation in accordance with an exemplary embodiment of the present disclosure.

With reference to FIG. 7, the robot 22 may position the sensor 10, such that the target surface, e.g., the bottom surface 12, of the sensor 10 abuts the preconditioned surface 32. Then, a wet-out operation may be performed. During the wet-out operation, the robot 22 may initially manipulate the sensor 10 by moving the sensor 10 in a rocking and rotating fashion, while the sensor 10 is in constant contact with the preconditioned surface 32. This manipulation may force the adhesive 52 to spread in order to maximize its coverage area. Subsequently, the robot 22 may apply a continuous predetermined pressure onto the sensor 10 for a predetermined duration of time. The predetermined pressure may be any suitable pressure, such as, for example, up to 100N, at least 100N, etc. The predetermined duration of time may be any suitable duration of time, such as, for example, up to one minute, at least one minute, etc. Upon completion of the wet-out operation, the bottom surface 12 of the sensor 10 may be securely affixed to the preconditioned surface 32.

Figure 8:
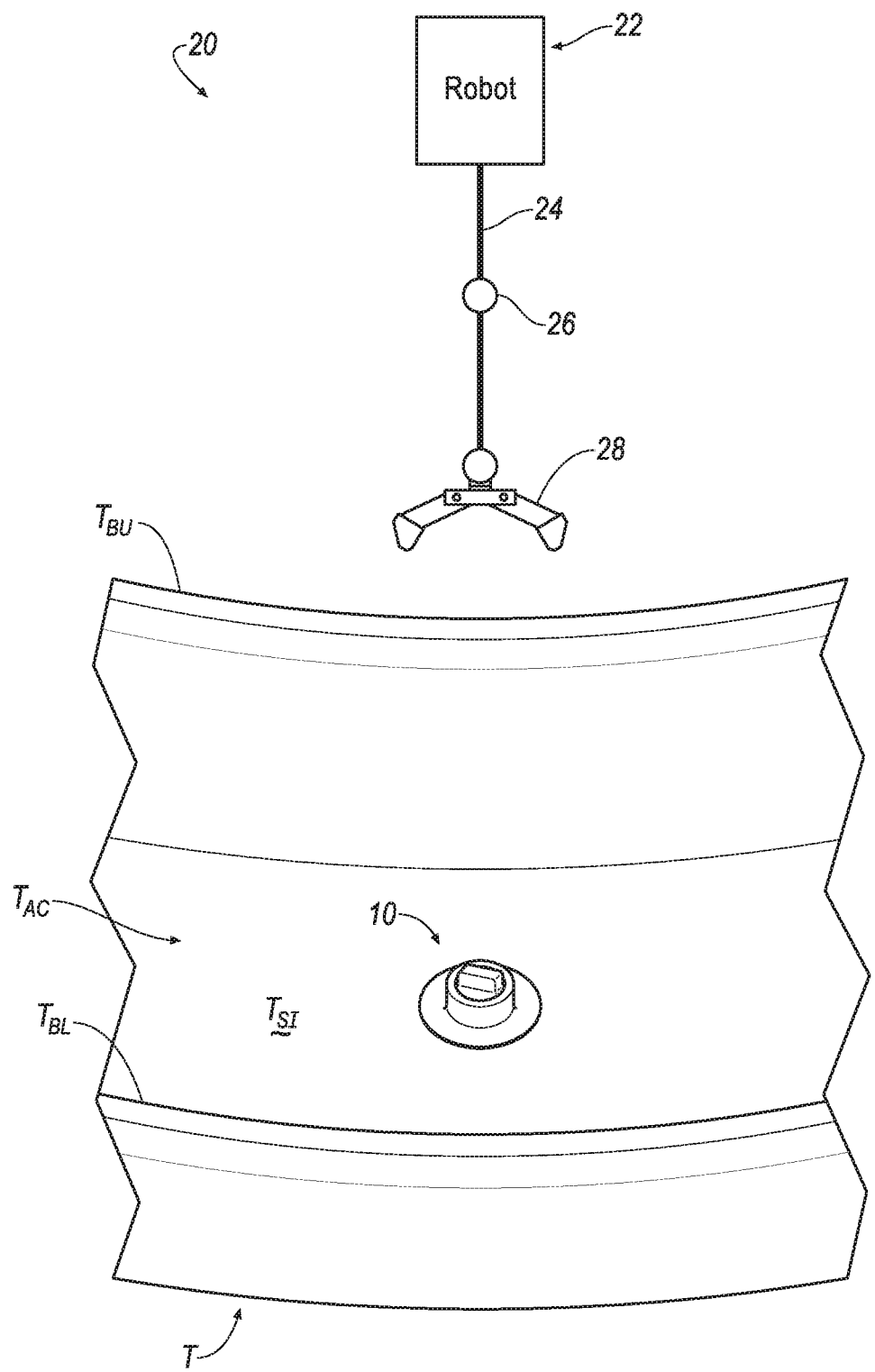
FIG. 8 is a perspective view of an exemplary tire with a sensor installed onto its inner surface.

With reference to FIG. 8, after the sensor 10 has been securely installed onto the preconditioned surface 32 of the tire T, the end effector 28 may release the sensor 10, and the robot 22 may retract and exit the passage $T_P$ of the tire T.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for installing a sensor onto an inner surface of a tire, the method comprising:
    robotically deglazing at least a portion of the inner surface of the tire, defining a preconditioned surface;
    robotically selecting the sensor;
    cleaning a target surface of the sensor;
    applying an adhesive to a least a portion of the target surface of the sensor;
    robotically positioning the sensor, wherein the target surface of the sensor abuts the preconditioned surface; and
    robotically performing a wet-out operation, wherein, while the sensor is in contact with the precondition surface, the sensor is moved in (i) a rocking motion about a first axis and (ii) a rotating motion about a second axis transverse to the first axis, and wherein a predetermined pressure is applied to the sensor for a predetermined period of time to affix the sensor to the preconditioned surface.

2. The method of claim 1, wherein at least a portion of the inner surface of the tire is robotically deglazed by means of a laser.

3. The method of claim 2, wherein the laser is operated at a wavelength between 1040 nm and 1200 nm.

4. The method of claim 3, wherein the laser provides an output of up to 130 watts, with a maximum pulse energy of less than 2.0 millijoules, a repetition frequency ranging from 1 kHz to 1000 kHz, and a pulse duration ranging from 1 nanosecond to 500 nanoseconds.

5. The method of claim 1, wherein at least a portion of the inner surface of the tire is robotically deglazed by means of a mechanical brush.

6. The method of claim 1, wherein at least a portion of the inner surface of the tire is robotically deglazed by means of a chemical wipe.

7. The method of claim 1, wherein the target surface is a bottom surface of the sensor.

8. A method for installing a sensor onto an inner surface of a tire, the method comprising:
    robotically deglazing at least a portion of the inner surface of the tire, defining a preconditioned surface;

robotically applying an adhesive to at least a portion of the preconditioned surface;
robotically selecting the sensor;
cleaning a target surface of the sensor;
robotically positioning the sensor, wherein the target surface of the sensor abuts the preconditioned surface; and
robotically performing a wet-out operation, wherein, while the sensor is in contact with the precondition surface, the sensor is moved in (i) a rocking motion about a first axis and (ii) a rotating motion about a second axis transverse to the first axis, and wherein a predetermined pressure is applied to the sensor for a predetermined period of time to affix the sensor to the preconditioned surface.

9. The method of claim 8, wherein at least a portion of the inner surface of the tire is robotically deglazed by means of a laser.

10. The method of claim 9, wherein the laser is operated at a wavelength between 1040 nm and 1200 nm.

11. The method of claim 10, wherein the laser provides an output of up to 130 watts, with a maximum pulse energy of less than 2.0 millijoules, a repetition frequency ranging from 1 kHz to 1000 kHz, and a pulse duration ranging from 1 nanosecond to 500 nanoseconds.

12. The method of claim 8, wherein at least a portion of the inner surface of the tire is robotically deglazed by means of a mechanical brush.

13. The method of claim 8, wherein at least a portion of the inner surface of the tire is robotically deglazed by means of a chemical wipe.

14. The method of claim 8, wherein the target surface is a bottom surface of the sensor.

15. A method for installing a sensor onto an inner surface of a tire, the method comprising:
robotically deglazing at least a portion of the inner surface of the tire, defining a preconditioned surface;
robotically applying an adhesive to at least a portion of the preconditioned surface;
robotically selecting the sensor;
robotically cleaning a target surface of the sensor;
robotically positioning the sensor, wherein the target surface of the sensor abuts the preconditioned surface; and
robotically performing a wet-out operation comprising:
while the sensor is in contact with the preconditioned surface, robotically moving the sensor in (i) a rocking motion about a first axis and (ii) a rotating motion about a second axis transverse to the first axis, forcing the adhesive to spread about at least a portion of the preconditioned surface; and
robotically applying a predetermined pressure to the sensor for a predetermined period of time to affix the sensor to the preconditioned surface.

16. The method of claim 15, wherein at least a portion of the inner surface of the tire is robotically deglazed by a laser.

17. The method of claim 16, wherein the laser is operated at a wavelength between 1040 nm and 1200 nm.

18. The method of claim 17, wherein the laser provides an output of up to 130 watts, with a maximum pulse energy of less than 2.0 millijoules, a repetition frequency ranging from 1 kHz to 1000 kHz, and a pulse duration ranging from 1 nanosecond to 500 nanoseconds.

19. The method of claim 15, wherein at least a portion of the inner surface of the tire is robotically deglazed by at least one of a mechanical brush or a chemical wipe.

20. The method of claim 15, wherein the target surface is a bottom surface of the sensor.

\* \* \* \* \*